United States Patent [19]

Roberts

[11] Patent Number: 4,885,428

[45] Date of Patent: Dec. 5, 1989

[54] SYSTEM FOR ELECTRICAL GROUNDING

[75] Inventor: Edgar Roberts, Valdosta, Ga.

[73] Assignee: A-1 Construction Company, Valdosta, Ga.

[21] Appl. No.: 183,585

[22] Filed: Apr. 19, 1988

[51] Int. Cl.⁴ .............................................. H01R 4/66
[52] U.S. Cl. ........................................ 174/6; 174/51; 439/92
[58] Field of Search ...................... 174/5 SG, 6, 7, 37, 174/38, 51, 59; 307/326, 327; 361/212, 217, 218, 220; 439/92, 100, 108, 386; 128/908

[56] References Cited

U.S. PATENT DOCUMENTS

| | | | |
|---|---|---|---|
| 438,592 | 10/1890 | Eckert et al. | 174/59 X |
| 469,765 | 3/1892 | Wilson | 174/59 X |
| 1,098,738 | 6/1914 | Kretzer | 174/6 X |
| 1,426,210 | 8/1922 | O'Neil | 174/59 |
| 2,452,491 | 10/1948 | Petree | 174/51 |
| 2,739,998 | 3/1956 | Kretzer | 174/6 |
| 2,958,843 | 11/1960 | Long | 174/6 X |
| 3,305,875 | 2/1967 | Hendrick | 174/6 X |
| 3,531,010 | 9/1970 | Handley et al. | 174/37 X |
| 3,710,003 | 1/1973 | Channell | 174/51 X |
| 3,769,460 | 10/1973 | Charles | 174/51 X |
| 4,226,498 | 10/1980 | Hauff | 174/6 X |
| 4,717,350 | 1/1988 | Lax | 439/92 |

FOREIGN PATENT DOCUMENTS 443674  7/1912  France ............................... 174/59

Primary Examiner—Laramie E. Askin
Attorney, Agent, or Firm—Jones, Askew & Lunsford

[57] ABSTRACT

A system for electrical grounding consisting of a series of grounding receptacles which include electrically insulative housings and grounding terminals which are interconnected by a common ground wire. The ground wire is also insulated from the surrounding environment and is electrically connected to a ground rod. The ground rod acts as a single grounding point which is shared by each electrical device which is connected to each grounding terminal.

16 Claims, 2 Drawing Sheets

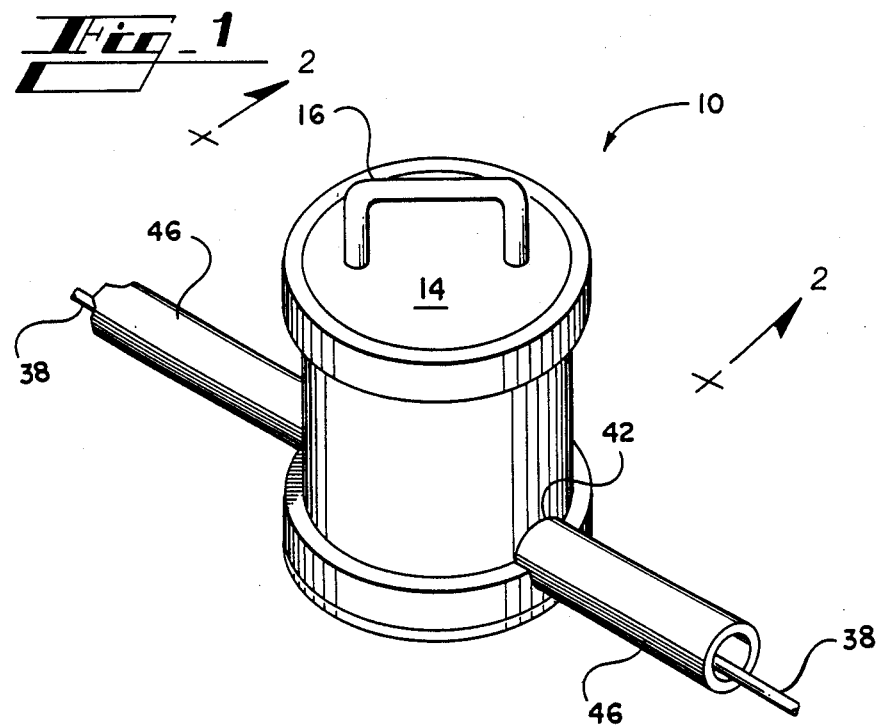
Fig_1
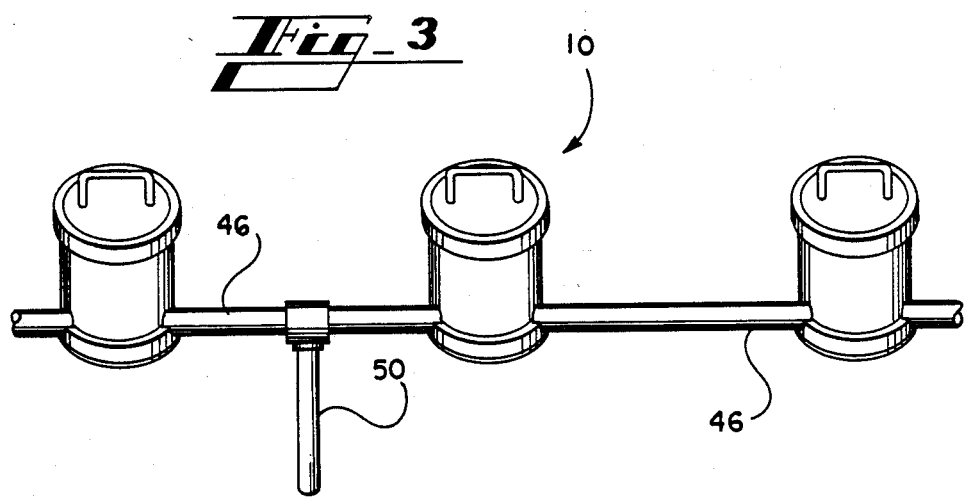
Fig_3

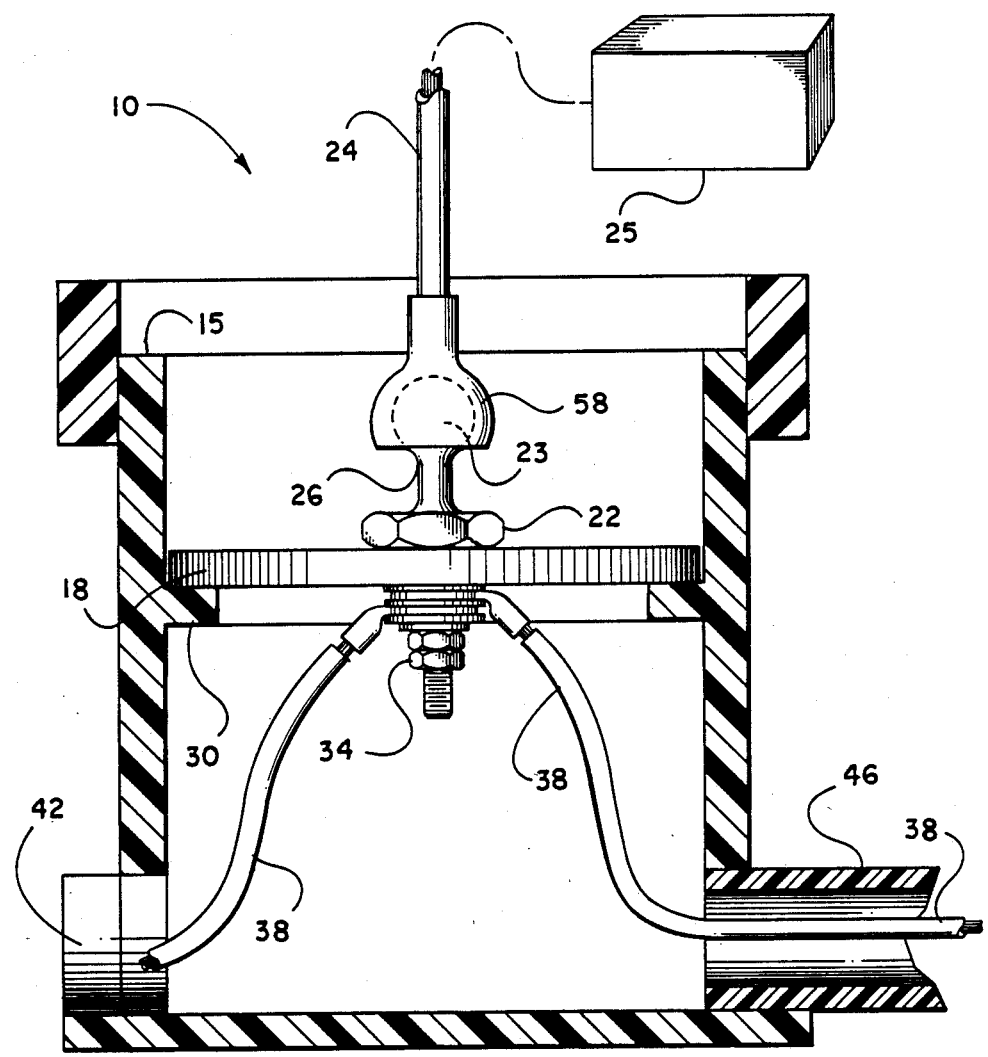
Fig_2

SYSTEM FOR ELECTRICAL GROUNDING

BACKGROUND OF THE INVENTION

This invention relates generally to electrical grounding systems, and more particularly concerns a system of grounding receptacles which are linked by a common ground wire and grounded to a common point.

Electrical service is provided in maintenance facilities such as submarine berths, shipyards, automobile repair garages, computer repair benches, and the like, in order to power tools, computers and the electrical equipment required for maintenance and repair. In order to ensure adequate safety and performance of the electrical equipment, it is necessary that the electrical equipment be grounded in some fashion. Conventionally, metallic receptacles have a copper rod threaded into the bottom, and the receptacles are embedded in a concrete pad adjacent a submarine berth, bench, bay, or the like, with the copper rod extending into the earth or concrete below. The electrical equipment is connected to the ground by a wire having a matable clamp, which is connected to the grounding receptacle terminal. In a normal installation, there may be a large number of electrical connections along with a large number of metallic ground receptacles.

Each metallic receptacle itself acts as a groundinng device and subjects the equipment connected to it to the ground potential of the earth in which it is situated. Even if the individual electrodes are somehow linked together to attempt to eliminate grounding voltage potential differences, each grounding receptacle may contribute a certain amount of in-ground variation potential depending on where it is placed. This is often caused by variable soil conditions, such as moisture content, electrolyte composition, metals content and the like. When measurements are taken of the electrical grounding system and the ground point on each receptacle, it is found that some receptacles provide a better ground to earth than others do. A voltage potential can be created between two or more pieces of electrical equipment which can affect the performance of equipment such as computeers that, although attached to separate grounding receptacles, are in communication with each other over some sort of transmission line. Data signal levels can be transmitted inaccurately if there is an extraneous current passing between the transmitting and receiving devices. Moreover, if the voltage potential is large enough, terminal inputs or ports can be destroyed. If the equipment has protective transistors installed internally, these can be burned out by inconsistent or different voltage levels where zero potential difference is expected.

Where electrical equipment aboard a seagoing vessel, such as a submarine, is to be grounded to the earth, an additional problem exists. The vessel can act as an electrode and the earth acts as a second electrode. Sea water, which contains electrolytes, may be present in the earth near the sea water and a current may be created across the gap between the vessel and the earth. In this situation, the ground potential could be affected, causing inaccurate measurements of ground potential. Additionally, the equipment acting as the electrodes, such as a cabinet, frame or chassis, may corrode faster because of the oxidation of one of the electrodes where a current is created. This can also occur where the atmosphere acts as the electrolyte, such as in the vicinity of sea water.

There is a need, then, for a system which can electrically ground a number of pieces of electrical equipment so that the variation in ground potential is reduced. Such a system should enable each piece of equipment to be grounded so as to share the same ground wire, thus virtually eliminating any difference between individual ground potentials.

SUMMARY OF THE INVENTION

Therefore, it is an object of the present invention to provide a system for reducing the variation between ground potentials of grounded electrical devices.

It is a further object of the present invention to provide a convenient, low cost means for grounding a number of electrical devices to a common ground point.

The foregoing objectives are achieved by an electrical grounding system comprising a number of grounding receptacles arranged so as to electrically connect several electrical devices to a common ground wire. This common ground wire is connected to a single ground electrode, such as a ground rod, which is grounded in the earth. The system reduces the variation in ground potential associated with individually grounded systems, and improves electrical measurements. Furthermore, since each receptacle comprises an insulative housing, it cannot act as a ground itself, thus further reducing the ground differential problems.

More particularly, the present invention provides an electrical grounding system comprising a plurality of grounding receptacles. Each of the receptacles comprises an electrically insulative housing having a ground terminal disposed therein which is connected to an electrical device and the common ground wire. There is at least one opening in the housing for passing the common ground wire through the housing. Each receptacle is connected to a common ground wire which is in electrical communication with a single ground electrode.

Other objects, features and advantages of the invention will become apparent upon reading the following detailed description and upon reference to the drawings.

BRIEF DESCRIPTION OF THE DRAWING

FIG. 1 is a perspective view of a preferred embodiment of the present invention.

FIG. 2 is a cross-sectional view taken along line 2—2 of FIG. 1.

FIG. 3 is a perspective view showing a series of linked grounding receptacles connected to a ground rod.

DETAILED DESCRIPTION OF THE INVENTION

While the invention will be described in connection with a preferred embodiment, it will be understood that I do not intend to limit the invention to that embodiment. On the contrary, I intend to cover all alternatives, modifications, and equivalents as may be included within the spirit and scope of the invention as defined by the appended claims.

Turning to FIG. 1, there is shown a preferred embodiment of the present invention which generally provides a grounding receptacle unit 10 containing a terminal, connecting ground wires and at least one opening through which pass the ground wires.

More particularly, the housing of the grounding receptacle 10 is preferably a hollow cylinder having an open top end and a closed bottom end, and is made of non-conductive material such as plastic, wood, glass ceramic, or other material known in the art. The receptacle 10 contains grounding connections and wiring to insulate them from the external environment. The cylinder has a removable cap 14 that is sized to fit within the top open end of the cylinder. The removable cap 14 protects the inside from the elements when the unit is not connected to a device. The cap 14 can be rested on an end surface 15 of the cylindrical wall constituting the housing, as shown in FIG. 2, or can be screwed or bolted or otherwise attached to the receptacle 10. The cap 14 can be removed by pulling on a handle 16 which is mounted to the cap 14. A support plate 18 is removably disposed within the receptacle 10 in an axial orientation and rests on a support flange 30. A hole is bored through the support plate 18 through which passes a ground terminal 22. The terminal 22 is made of a conductive material, preferably metallic. It can be shaped so as to have a ball end 23 facing upwards which matably receives a mating clamp 58 as will be described in greater detail hereinbelow. However, it is to be understood that any shape that functions to receive and secure a matable clamp is usable. The terminal 22 has a terminal shaft 26, which is threaded at its lower part and which passes axially through the hole in the support plate 18. The terminal 22 is secured by any conventional means, such as a nut 34 and lock washer threaded onto the terminal shaft 26 on the obverse side of support plate 18, or can be fastened by any other means commonly known in the art.

Attached to terminal shaft 26 are a set of ground wires 38 which are in electrical communication with the terminal shaft 26. The ground wires 38 pass through an opening 42 which is made transversely in the cylinder. The opening 42 receives a conduit 46 within which is passed the wires 38. The conduit is constructed of a material similar to that of the cylinder and is also non-conductive. The conduit 46 extends radially from the cylinder 10. In a preferred embodiment two openings 42 are present, with a conduit 46 extending from each opening. One wire 38 extends out of the receptacle 10 through one conduit and is connected to terminal shaft 26. The other wire 38 extends out of the receptacle 10 through the other conduit and is similarly connected to terminal shaft 26. Alternatively, a single insulated wire can be used which has the wire exposed where it is wrapped around or otherwise in electrical communication with the terminal shaft 26.

In operation, an electrical device 25, such as a computer, electrical tool, or other electrical unit, has a ground wire 24 extending out of the device, as shown in FIG. 2. The ground wire 24 has at its terminus a mating clamp 58 made of a conductive material such as metal. The mating clamp 58 is designed so as to receivably engage the ball end 23 of the terminal 22 thus placing the device 25 in electrical communication with the ground wires 38.

Turning to FIG. 2 and 3, there is shown an electrical grounding system using a number of grounding receptacles 10 which are connected via the wires 38 passing through the conduit 46. The ground wire 38 is electrically connected to a ground rod or other such electrode 50 that is sunk into the ground source (not shown) such as concrete, earth or the like. Each grounding receptacle 10 is inserted in the dock with the cap 14 and handle 16 exposed for easy access to the terminal 22. Since the housing of each grounding receptacle 10 is insulative it does not itself act as a ground when an electrical device 25 is connected to the terminal 22; therefore, there is no grounding effect with the grounding receptacle 10. By sharing a common ground wire 38, each device 25 shares a common ground potential.

In a preferred embodiment the present invention is used at the side of a dock or berth where a vessel, such as a submarine, is docked for repair or maintenance work. The grounding receptacle can also be used at the site where a missile is being assembled, the attaching of warheads, an inspection building or storage facility prior to going aboard the submarine. Electrical equipment from the submarine is connected by way of the ground wire 24 to the individual grounding receptacle 10, thereby grounding that particular electrical device. Since each device will be commonly grounded with other devices, there will be no difference in ground potential. This will reduce inaccuracies of measurements or data transmission, or risk of damage to the equipment as described above.

I claim:

1. An electrical grounding system, comprising:
   a common ground wire which is in electrical communication with a single ground electrode grounded in the earth;
   a plurality of grounding receptacles each comprising an electrically insulative housing having a closed bottom end;
   at least one opening in each housing passing said common ground wire into each housing;
   a flange on the interior of each housing;
   a support plate removably disposed on each flange;
   a ground terminal rigidly connected to each support plate, each ground terminal being for connecting to an electrical device; and
   each ground terminal being electrically connected to said common ground wire.

2. The system of claim 1, wherein each housing is composed of an electrically insulative material selected from the group consisting of plastic, ceramic, wood, and glass.

3. The system of claim 1, wherein said common ground wire comprises at least one wire in electrical communication with said ground electrode and each of said ground terminals such that each electrical device, when connected with a ground terminal, shares a common voltage potential with each other.

4. The system of claim 1, wherein said common ground wire is disposed within an electrically insulative conduit between each of said receptacles so as to avoid contact of said common ground wire with the environment.

5. The system of claim 1, wherein each ground terminal comprises a conductive material disposed within its respective housing for connecting an electrical device and said common ground wire and is insulated from the environment external to its respective housing.

6. The system of claim 1, wherein each opening comprises at least one hole in each housing capable of permitting electrical communication between each ground terminal and said common ground wire.

7. The system of claim 1, wherein each grounding receptacle further comprises a removable cap which rests on the upper end surface of said grounding receptacle.

8. An electrical grounding system, comprising:
an electrically insulative housing having a closed bottom end;
at least one opening in the housing sized to permit passage of a common ground wire into the housing;
a flange on the interior of the housing;
a support plate removably disposed on the flange;
a single ground electrode for grounding in the earth; and
a ground terminal rigidly connected to the support plate, the ground terminal being for connecting to at least one electrical device, the ground terminal being connected to a common ground wire which extends through the opening and into electrical communication with the single ground electrode, such that each electrical device, when connected in electrical communication with the ground terminal, shares a common voltage potential with each other electrical device.

9. The electrical grounding system as recited in claim 8, further comprising a removable cap which rests on the upper end surface of the housing.

10. The electrical grounding system as recited in claim 8, further comprising a flange at the upper end of the housing, the flange extending above an upper end surface of the housing to define a well for receiving a removable cap to close the upper end of the housing.

11. The electrical grounding system as recited in claim 8, further comprising a conduit received by the opening, the common ground wire disposed within the conduit so as to avoid contact of the common ground wire with the environment.

12. The electrical grounding system as recited in claim 8, wherein the ground terminal further comprises:
means for connecting the common ground wire to the ground terminal;
a connector at an upper end of the ground terminal extending above the support plate, the connector being for electrically connecting the ground terminal to an electrical device.

13. The electrical grounding system as recited in claim 12, wherein the means for connecting the common ground wire comprises:
a threaded shaft depending from the ground terminal through a hole in the support plate; and
a nut received by the threaded shaft to secure the common ground wire to the threaded shaft.

14. The electrical grounding system as recited in claim 8, wherein the housing is cylindrical.

15. The electrical grounding system as recited in claim 14, wherein the flange defines an annular ring.

16. An electrical grounding system, comprising:
a plurality of grounding receptacles;
a single ground electrode grounded in the earth; and
an electrically insulated common ground wire which is in electrical communication with the single ground electrode,
each of the receptacles comprising:
an electrically insulative housing having a closed bottom end;
at least one opening in each housing passing the common ground wire into each housing; and
a ground terminal connected to the common ground wire and for connecting to at least one electrical device, so that each electrical device, when connected in electrical communication with one of the ground terminals, shares a common voltage potential with each other of the electrical devices.

* * * * *